Patented Dec. 11, 1928.

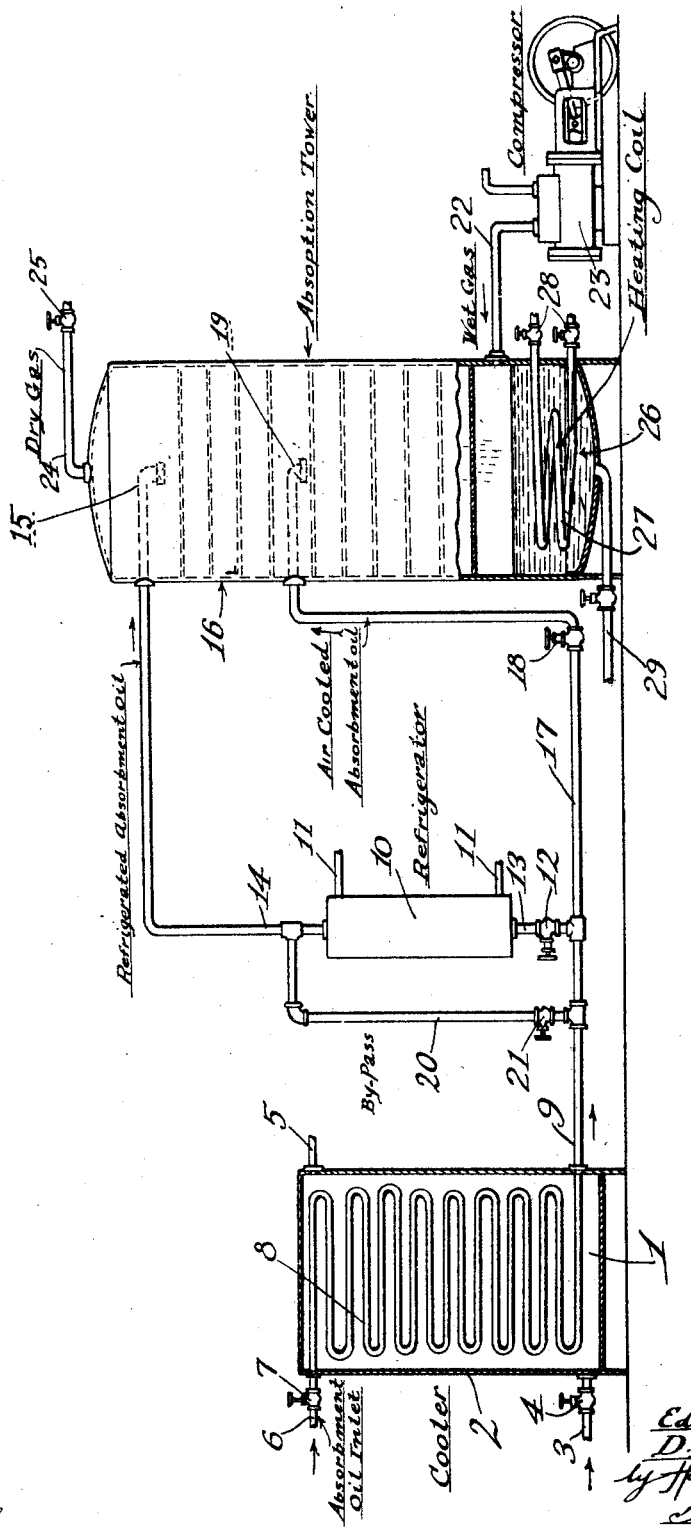

1,695,139

UNITED STATES PATENT OFFICE.

EDWIN R. COX AND DEXTER A. CUSHMAN, OF LOS ANGELES, CALIFORNIA.

PROCESS OF COMBINED ABSORPTION AND FRACTIONATION FOR RECOVERING GASOLINE FROM GAS.

Application filed August 31, 1926. Serial No. 132,720.

Our invention is a process and apparatus of combined absorption and fractionation for recovering gasoline from gas, being particularly adapted for recovering gasoline from natural gas.

An object of our invention is a combination of an absorption and fractionating process in which the suitable condensable vapors in natural gas are absorbed in an absorbing column and at the same time this column functions to condense, evaporate and recondense the suitable vapors by a fractionation process.

In recovering gasoline from natural gas by an absorption process, it is usual to absorb as much as possible in an absorption column or tower or a series of same, or in horizontal type absorbers. The absorption oil is then distilled, the gasoline being separated and condensed. In the various steps of separating the useless or injurious gases and oils from the gasoline, this is done by weathering or some process of rectification. In weathering the product, heavy losses are entailed, while the usual rectifying processes are quite expensive, involving the use of costly compressors and other equipment, as well as the consumption of considerable power.

An object of our invention is to selectively absorb the valuable components from the natural gas in an absorbing oil with as little as possible of the injurious fractions. These are assumed to be mainly methane, ethane and propane. This will be accomplished by combining the fractionating features with the absorption process.

As is known in the absorption process, the absorbent oil becomes heated by the latent heat of evaporation of the gasoline absorbed and by the heat of compression of the fixed gas absorbed, thus giving a different temperature between the ends of the absorption column. In our invention we maintain this difference of temperature in the absorption tower greater than that normally due to the latent heat of evaporation of the gasoline absorbed and the heat of compression of the fixed gas absorbed.

In an absorption process using an absorption tower, the absorbent oil flows downwardly and the wet gas upwardly into intimate contact with the oil. In fractionating or rectifying the process is very similar, the downflowing liquid being reflux obtained by partially condensing the upwardly flowing vapors, these being the vapors in counter-flow to the condensate. A condition that is essential for fractionating is a proper temperature gradient between the top and bottom of the tower. The top must be cold enough to condense all the vapors it is desired to retain and the bottom hot enough to evaporate all it is desired to expel. In an absorption process we find that the absorbent oil is heated between 10 to 20° F. or an average of 15° F. due to the latent heat of evaporation of the gasoline condensed and the heat of compression of the fixed gases absorbed.

A characteristic of our invention is in an absorption tower to refrigerate part of the absorbent oil and flow same into the upper part of an absorption tower and at a lower level flow a body of absorption oil cooled to a temperature readily obtained by ordinary water cooling to atmospheric temperatures. The oil at the base of the tower is maintained at a relatively high temperature either by the heat of compression of the wet gas forced into the tower, or by suitable heating coils.

We arrange our apparatus to include a cooling device, preferably water cooled, for the absorbent oil, and by means of suitable valves pass some of the cooled oil through a refrigerator and discharge same at the top of an absorption tower. Another part of the water cooled oil is passed into the absorption tower below the top. The oil pipes are provided with suitable valves so that if desired the oil may be by-passed around the refrigerator and all discharged at the top of the tower without refrigeration, or shut off the supply of oil to the mid position of the tower and pass all of same through the refrigerator. The wet gas is fed to the lower end of the tower under compression and preferably maintains its heat of compression without being cooled, and also in the base of the tower we provide heating coils in the accumulated absorption oil, for raising the oil at the base of the tower to the desired temperature to get the desired temperature gradient between the top and bottom of the tower.

Our invention will be more readily understood from the following description in connection with the drawings, which illustration is a diagrammatic view of a plant for the combined process of absorption and fractionation for recovering gasoline from natural gas.

A cooler is designated by the numeral 1 and is preferably of the water cooled type, being indicated by a tank 2 with an inlet water pipe 3 controlled by a valve 4 and an outlet water pipe 5. Such water preferably is cooled in atmospheric cooling towers or the like.

The absorbent oil is fed through a pipe 6 having a valve 7, the oil passing through coils 8 in the water and being conducted out through the pipe 9. A refrigerator 10 is of any suitable character, having flow pipes 11 for the refrigerant. A valve 12 controls the flow of absorbent oil through the pipe 13 into the refrigerator and hence through the pipe 14 to the upper part 15 of the absorption tower 16. The remainder of the oil continues through the pipe 17, passing through the valve 18 into what may be termed a mid position 19 in the absorption tower.

A by-pass pipe 20 is provided having a valve 21 so that by shutting off the valve 12 some of the oil may be by-passed around the refrigerator from the pipe 9 to the pipe 14, or if the valve 18 is also closed all the oil may be by-passed from the refrigerator. If the valves 18 and 21 are closed all the oil will be passed through the refrigerator.

The wet gas enters through a pipe 22 after being compressed as indicated diagrammatically by a compressor 23 and without any subsequent cooling after being compressed. The dry gas discharges through the pipe 24, this preferably being controlled by a valve 25. The absorbent oil accumulates in the bottom 26 of the tank and heating coils 27 are imbedded in this body of oil, such pipes being controlled by valves 28. The absorbent oil with the gasoline content is discharged through the pipe 29, being controlled by a valve 30.

In the cooler 2, while illustrated as of the water cooled type, in practice we cool the water by atmospheric water coolers so that the water is at substantially the temperature of the air. Therefore, the absorbent oil passed through the coils in becoming cooled to about the temperature of the water acquires what might be termed an air temperature, so that in effect the absorbent oil is air cooled. Therefore the oil discharging in the mid position 19, while cooled by water, is of substantially the air temperature.

The operation of our method and plant is substantially as follows:

We cool the absorbent oil to as low a temperature as practical, by water, to atmospheric conditions, a temperature of 60° to 70° F. being suitable, this cooling being done in the cooler. The stream of oil is divided by proper control of the valves 12 and 18, the valve 21 being presumed closed so that about 60 to 80% is introduced at an intermediate level, this being preferably about two thirds the height of the tower as indicated by the discharge 19 of the water cooled oil. The remainder of the absorbent oil passed through the refrigerator 10, this being substantially 20 to 40%, is cooled to a temperature of 30 to 40° F. and introduced at the top of the tower as indicated by the numeral 15. The oil at the bottom of the tower is heated to a suitable temperature by either relying on heat of compression of the wet gas introduced or by using heating coils.

The wet gas previously compressed, as in a normal process, is not cooled but introduced with a portion or all of its heat of compression, thus being at a temperature of substantially 250° F. On account of the weight of the gas being much less than that of the oil, the oil is not heated to this full temperature but to a temperature of approximately 60 to 110° F. Should the temperature of the oil not be that desired, it may be additionally heated by the heating coils 27, or these coils may be relied upon substantially entirely to give the proper temperature difference.

By the above procedure we maintain substantially a temperature gradient of approximately 60° F. between the top and the bottom of the absorption tower, instead of the usual temperature gradient of about 15° F., this decided temperature gradient being a characteristic feature of our invention.

It is obvious that our invention as described above may be departed from in different features. For instance, all the oil may be introduced at the top of the absorber at atmospheric temperatures such as 60 to 70° F., being water cooled, this being done by by-passing the oil around the refrigerator as above described. As an alternative procedure, all the oil may be refrigerated to a suitable temperature and introduced at the top of the tower, this being done by closing both the valves 18 and 21. As above mentioned the temperature of the bottom oil in the absorber may be maintained at the proper degree by the heat of compression of the wet gas passing into the tower, by a heating coil in the oil or by both, or if desired steam may be injected into the bottom of the tower for heating.

From the above description it will be seen that we have provided an absorption plant in which the temperature gradient in the absorption column is much greater than that usually used so that the temperature of the oil may be increased by the latent heat of evaporation of the gasoline absorbed and the heat of the compressed or fixed gas absorbed and still leave a decided difference of temperature between the oil at the top and the bottom of the tower. This large difference of temperature causes a fractionating or rectifying operation on the wet gas by causing a continuous condensation and evaporation of the constituents of the gas, thereby enabling us to obtain an absorbed product which embodies the principle of desirable condensable oils and has passed with the dry gas the undesirable non-condensable gases.

The elimination of these undesirable constituents which are mainly methane, ethane and propane in the usual process, is complicated and costly. We estimate that they take up approximately one half the absorptive capacity of the absorbing menstruum. By eliminating them as above described, we are able to reduce the size of the other plant equipment, such as stills, evaporators, dephlegmators, exchangers, preheaters, coolers, condensers, recompressors, rectifiers, etc., and so substantially lower the cost of the plant.

It is obvious that our invention may be applied to different types of absorption plants or apparatus, and that the general features and specific details of our invention both as to the method and apparatus may be considerably changed without departing from the spirit thereof as set forth in the description, drawings and claims.

Having described our invention, what we claim is:

1. The process of combined absorption and fractionation for recovering gasoline from natural gas, comprising cooling an absorbent oil to substantially air temperature, refrigerating part of this oil to a considerably lower temperature, flowing the refrigerated oil downwardly through an absorption tower, flowing the air temperature oil downwardly through a lesser portion of the absorption tower and flowing compressed wet gas without precooling, upwardly through the absorption tower.

2. The process of combined absorption and fractionation for recovering gasoline from natural gas, comprising cooling an absorbent oil to substantially air temperature, refrigerating part of this oil to slightly above freezing temperature, passing the refrigerated oil downwardly through an absorption column, passing the air temperature oil downwardly through a lesser portion of the same absorption column, passing wet compressed gas without precooling upwardly through the column, and drawing off dry gas at the top of the column.

3. The process of combined absorption and fractionation as claimed in claim 2, in addition applying heat other than that of the heat of compression of the wet gas to the absorbent oil in the base of the absorption column.

4. A process of combined absorption and fractionation for recovering gasoline from natural gas, comprising cooling an absorbent oil to substantially air temperature, refrigerating about one third of the oil to a temperature slightly above freezing, passing said oil downwardly through an absorption column, passing the balance of the oil downwardly through the same absorption column, through a lesser distance from the bottom, passing wet compressed gas without precooling upwardly through the absorption column, drawing off the dry gas at the top and heating the absorbent oil in the base of the tower to approximately 100° F.

5. A process of combined absorption and fractionation for recovering gasoline from natural gas, comprising cooling an absorbent oil to substantially air temperature of 60 to 70° F., refrigerating substantially 20 to 40% of such oil to about 30 to 40° F., passing such refrigerated oil downwardly through an absorption column, passing the remainder of the absorbent oil downwardly through the same column through a lesser distance, passing compressed wet gas without precooling upwardly through the column, and maintaining the temperature of the absorbent oil in the base of the column at substantially 80 to 110° F.

6. The process of combined absorption and fractionation to recover gasoline from natural gas, comprising introducing absorbent oil into an absorption column at the top and at a position substantially one third down from the top, cooling the whole of the oil to substantially air temperature prior to introduction, utilizing part of the oil after refrigeration for introduction at the top of the column, by-passing some of the air temperature oil into the top to secure the desired temperature gradient of the column, and introducing wet compressed gas into the base of the column.

7. The process of combined absorption and fractionation as claimed in claim 6, maintaining the temperature of the absorbent oil at the base of the column at a higher temperature than that produced by heat of compression of the wet gas.

8. An apparatus for the combined absorption and fractionation for the recovery of gasoline from natural gas, comprising in combination an absorption tower having a first inlet for oil at the top, a second oil inlet positioned below the top, an inlet for wet gas at the bottom, an outlet for dry gas at the top, means to cool a body of absorption oil to substantially air temperature, means to refrigerate part of said oil, means to pass said refrigerated oil into the first inlet, and means to pass some of the air cooled oil into the second inlet.

9. An apparatus for the combined absorption and fractionation as claimed in claim 8, having means to by-pass the air cooled oil around the refrigerating means.

10. An apparatus for the combined absorption and fractionation for recovering gasoline from natural gas, comprising in combination an absorption tower, a first oil inlet at the top, a second oil inlet positioned below the top, a compressor for wet gas, means to conduct said gas without substantial cooling to the base of the tower, an outlet at the top for dry gas, a cooler for absorption oil, a pipe leading from same to the second oil inlet, a refrigerator, and piping to conduct part of the cooled oil through the refrigerator to the first top inlet.

11. An apparatus for the combined absorption and fractionation for recovering gasoline from natural gas as claimed in claim 10, having a pipe to by-pass some of the cooled oil around the refrigerator and valves to control the flow of oil through the refrigerator to the second oil inlet and through the by-pass.

In testimony whereof we have signed our names to this specification.

EDWIN R. COX.
DEXTER A. CUSHMAN.